US006393838B1

(12) United States Patent

Moriya et al.

(10) Patent No.: US 6,393,838 B1
(45) Date of Patent: May 28, 2002

(54) HYDRAULIC CONTROL DEVICE FOR WORKING MACHINES

(75) Inventors: Naoyuki Moriya; Hideto Furuta, both of Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 0 days.

(21) Appl. No.: 09/582,942

(22) PCT Filed: Nov. 10, 1999

(86) PCT No.: PCT/JP99/06250

§ 371 (c)(1),
(2), (4) Date: Dec. 8, 2000

(87) PCT Pub. No.: WO00/29752

PCT Pub. Date: May 25, 2000

(30) Foreign Application Priority Data

Nov. 12, 1998 (JP) .......................................... 10-322350

(51) Int. Cl.[7] .............................................. F16D 31/02
(52) U.S. Cl. .......................................... 60/422; 60/426
(58) Field of Search .................................. 60/422, 426

(56) References Cited

U.S. PATENT DOCUMENTS

| | | | | |
|---|---|---|---|---|
| 4,712,376 A | * | 12/1987 | Hadank et al. | 60/427 |
| 4,856,278 A | | 8/1989 | Widmann et al. | |
| 5,167,121 A | * | 12/1992 | Sepehri et al. | 60/422 |
| 5,873,244 A | * | 2/1999 | Cobo et al. | 60/422 |
| 6,282,891 B1 | * | 9/2001 | Rockwood | 60/422 |

FOREIGN PATENT DOCUMENTS

| | | |
|---|---|---|
| DE | 3644736 A1 | 7/1988 |
| JP | A-4-131503 | 5/1992 |
| JP | U-5-3601 | 1/1993 |

* cited by examiner

*Primary Examiner*—Kevin Lee
(74) *Attorney, Agent, or Firm*—Oliff & Berridge, PLC

(57) ABSTRACT

The composite operation efficiency can be improved in a work machine with a plurality of hydraulic actuators. In the control section the flows to be shared to the respective hydraulic actuators are calculated on the basis of the permissible flow in compliance with an operating quantity of an operating tool, and control commands are outputted to an electromagnetic pressure valve so that the corresponding shared flows are supplied to the respective hydraulic actuators.

18 Claims, 6 Drawing Sheets

HYDRAULIC CONTROL DEVICE FOR WORKING MACHINES

BACKGROUND OF THE INVENTION

1. Field of Invention

The invention relates to a hydraulic control device for a work machine.

2. Description of Related Art

Generally, some work machines have a plurality of hydraulic actuators, a hydraulic pump to feed pressurized oil to the hydraulic actuators, control valves operating so as to control feed of the pressurized oil to the respective hydraulic pumps, and a control unit to output control commands to an actuator of the control valves by inputting operation signals from operating tools. For the hydraulic control system, there is a closed center system in which oil is not bled when the control valve is at the neutral position. Conventionally in such a closed center system, the degree of openness (spool positions) of the respective control valves is constructed so that the degree is controlled in response to the degree of operation of an operation tool corresponding thereto regardless of the operating status of the other operation tools.

However, where a plurality of operation tools are operated in combination, the flow requested by the respective hydraulic actuators required for operating the corresponding operation tools can exceed the flow which the hydraulic pump can feed. In such cases, the amount of pressurized oil supplied into the hydraulic actuators, passing through the respective control valves, becomes less than the requested volume. However, because the degree of openness of the respective control valves is controlled in response to the operating degree of the operation tools corresponding thereto, as described above, the operating degree may be increased more than the feeding volume of the hydraulic pump. In such a case, the hydraulic actuators may become vacuous, resulting in inadequate movement. For example, smooth actuation is hindered when a front attachment attached to a work machine is interlocked therewith and actuated. Another problem occurs in that the operation efficiency may be worsened.

SUMMARY OF THE INVENTION

In various exemplary embodiments of the hydraulic control device for a work machine according to the invention, the hydraulic control device for a work machine includes a plurality of hydraulic actuators, a hydraulic pump for feeding pressurized oil to the hydraulic actuators, control valves for controlling the feeding of pressurized oil to the respective hydraulic actuators, and a valve operating means for operating the respective control valves. The hydraulic control device also includes a control unit which inputs signals coming from an operation status detector for detecting the operation status of the operating tools for the respective hydraulic actuators and outputs control commands to the valve operator corresponding thereto on the basis of the corresponding input signals wherein the corresponding control unit calculates the amount of flow for sharing the output flow of the hydraulic pump to the respective hydraulic actuators on the basis of input signals from the operation status detector and outputs control commands to the valve operator in order to feed the corresponding shared flow to the respective hydraulic actuators.

As such, the control valves operate so as to supply the shared flow to the respective hydraulic actuators, wherein when operating a plurality of hydraulic actuators in combination, the output volume of the hydraulic pump can be adequately shared to the respective hydraulic actuators, and, at the same time, it is possible to prevent the degree of openness of the control valve from becoming greater than the supply volume from the hydraulic pump, whereby its composite operation efficiency can be improved.

Thus, it is possible to calculate the output flow of the hydraulic pump on the basis of the maximum torque, number of revolutions, and discharge pressure of the pump.

Also, in a case where the sum of the requested flows of the respective hydraulic actuators required on the basis of the operating status of an operating tool is smaller than the output flow of the hydraulic pump, it is possible to prevent the shared flow from becoming greater than the requested flow by setting the requested flows of the respective hydraulic actuators to the shared flow.

DETAILED DESCRIPTION OF EXEMPLARY EMBODIMENTS

Figure 1:
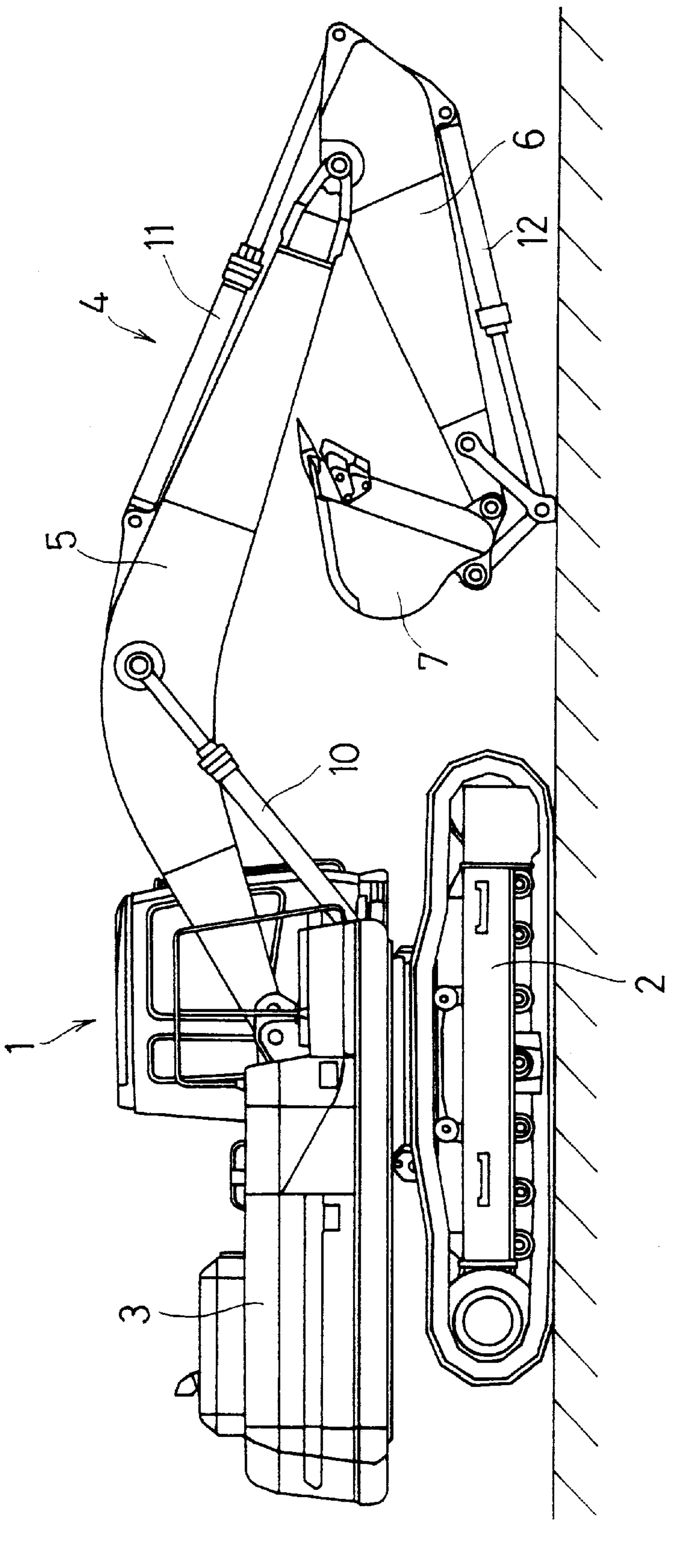
FIG. 1 is a side elevational view of a hydraulic shovel.

Next, a description is given of an exemplary embodiment of the invention with reference to the accompanying drawings. A hydraulic shovel 1 is composed of a crawler type lower structure 2, an upper structure 3 supported so as to freely swivel on the lower structure 2, and respective portions, such as a front attachment 4, which are attached to the upper structure 3, wherein the basic construction of the front attachment 4 is composed of a boom 5 whose base end portion can freely rock on the upper structure 3, a stick 6 supported on the tip end portion of the boom 5 so as to freely rock, and a bucket 7 supported at the tip end of the stick 6.

Further, the hydraulic shovel 1 is provided with various types of hydraulic actuators (FIG. 2), such as motors 8, 9 for left and right travel, a boom cylinder 10 to rock the boom 5, a stick cylinder 11 to rock the stick 6, a bucket cylinder 12 to rock the bucket 7, and an attachment cylinder 13 to actuate an attachment (not illustrated). Actuation of the hydraulic actuators is carried out based on the supply of pressurized oil from a hydraulic pump P driven by an engine.

Figure 2:
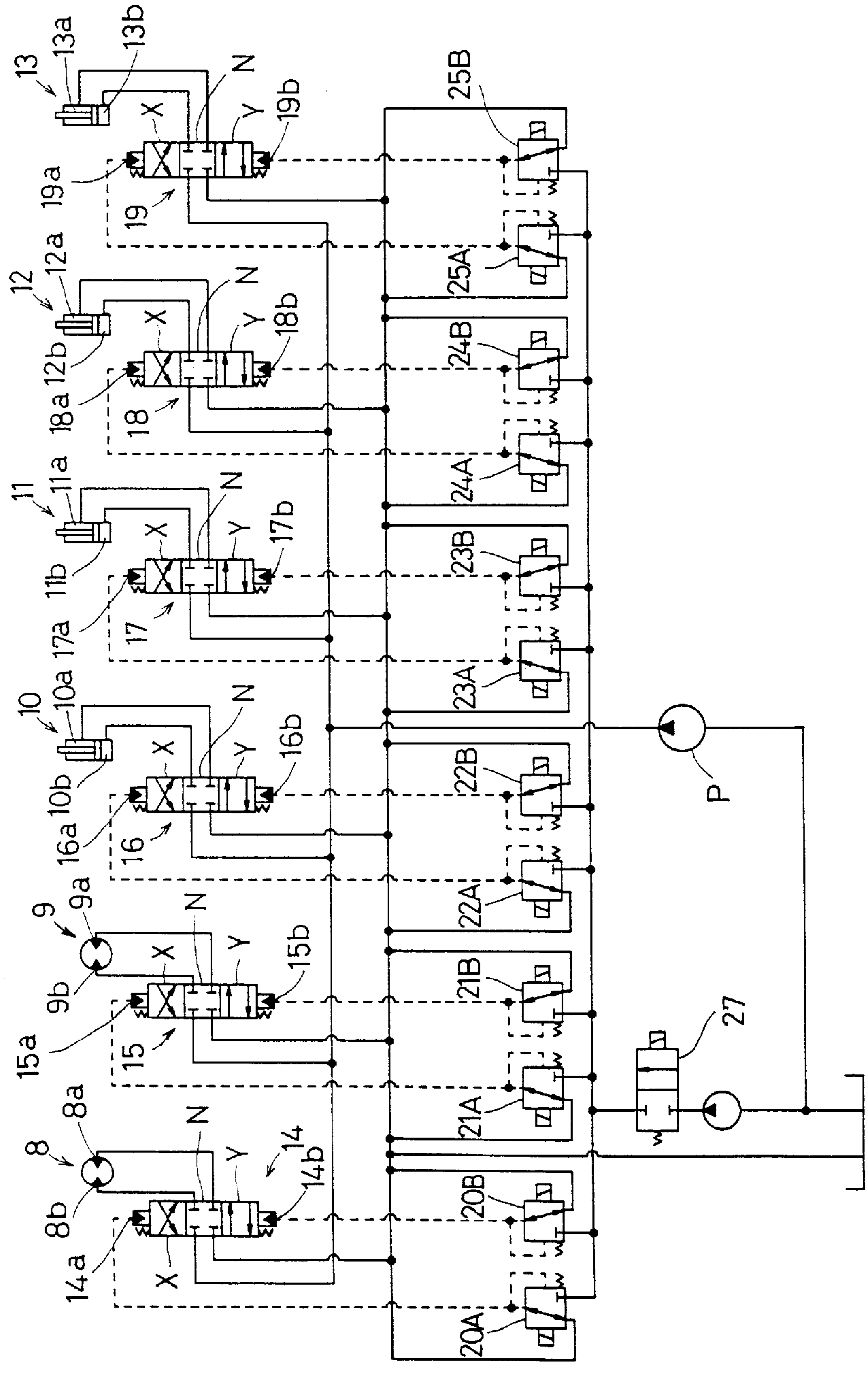
FIG. 2 is a sketch of hydraulic circuits showing feeding of pressurized oil to the hydraulic actuators.
Figure 3:
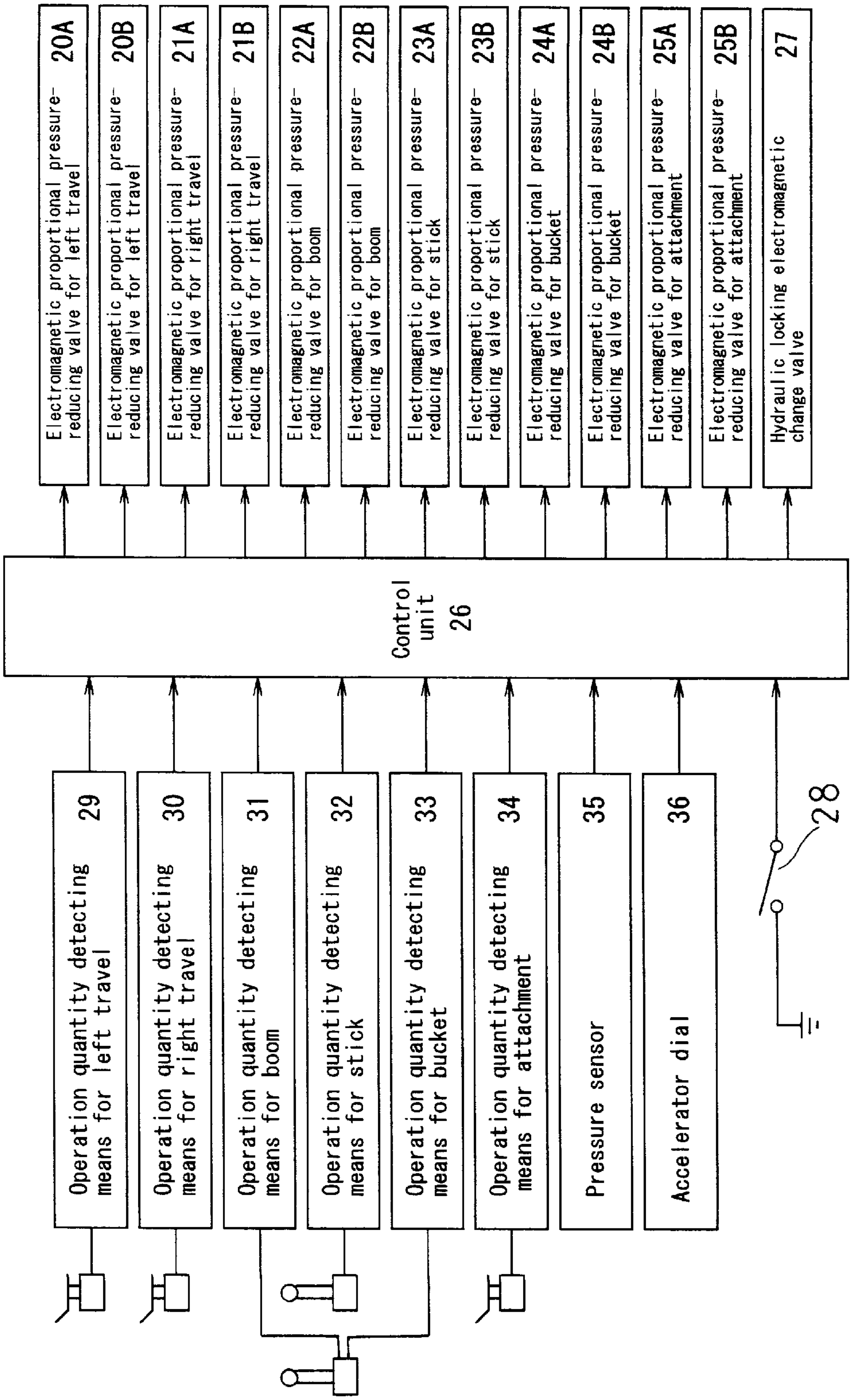
FIG. 3 is a block diagram showing input and output of the control unit.

FIG. 2 shows a sketch of a pressurized oil feeding circuit to the hydraulic actuators 8 through 13. In the drawing, 14 through 19 are control valves for left travel, right travel, boom, stick, bucket and attachment, each of which controls supply of pressurized oil to the respective hydraulic actuators. The control valves 14 through 19 are composed of a pilot-operated type three-position change valve.

Although the control valves 14 through 19 are located at the neutral position N at which no pressurized oil is fed to the hydraulic actuators 8 through 13 in a state where pilot pressurized oil is not supplied to pilot ports **14*a* through 19*a* or 14*b* through 19*b*, a spool moves by pilot pressurized oil being supplied to the pilot ports 14***a* through 19*a* or 14*b* through 19*b*, whereby the control valves 14 through 19 are changed to a pressurized oil feeding position X or Y where a valve path for supplying pressurized oil from the hydraulic pump P to oil chambers 8*a* through 13*a* of the corresponding hydraulic actuators 8 through 13 is opened, and another valve path for returning discharged oil from the other oil chambers 8*bbbbb* through 13*b* of the hydraulic actuators 8 through 13 to an oil tank is opened. The degree of openness (spool position) of the valve paths of the above-mentioned control valves 14 through 19 is controlled by pilot pressure provided by the pilot ports 14*a* through 19*a* or 14*b* through 19*b*.

In addition, electromagnetic proportional pressure valves 20A through 25A, and 20B through 25B output pilot pressurized oil to the pilot ports 14*a* through 19*a*, and 14*b* through 19*b* of the control valves 14 through 19. The output pressure of the electromagnetic proportional pressure valves 20A through 25A and 20B through 25B is controlled on the basis of commands provided by a control unit 26 described below.

Also, in FIG. 2, 27 is an electromagnetic change valve for hydraulic locking. The electromagnetic change valve 27 closes the oil path for feeding pilot pressurized oil to the electromagnetic proportional pressure valves 20A through 25A and 20B through 25B in a state where a lock switch 28 is opened, whereby operation of the hydraulic actuators, 8 through 13 is locked. However, the oil path for feeding pilot pressurized oil is opened in a state where the lock switch 28 is closed, whereby the operation of the hydraulic actuators 8 through 13 is enabled.

Further, in FIG. 3, 29 through 34 are operation quantity detectors which, respectively, detect the operation quantities of the respective operating levers and operation pedals for left travel, right travel, boom, stick, bucket and attachment. Detection signals outputted from the operation quantity detectors 29 through 34 are inputted into the control unit 26.

The control unit 26 is constructed of a microcomputer and is constructed so as to input signals from the operation quantity detectors 29 through 34, pressure sensor 35 for detecting the discharge pressure of the hydraulic pump P, accelerator dial 36, and lock switch 28. The control unit 26 also outputs control commands to the electromagnetic proportional pressure valves 20A through 25A, 20B through 25B, and hydraulic locking electromagnetic change valve 27 on the basis of the corresponding input signals.

Herein, the accelerator dial 36 is an operation dial that sets the number of revolutions of an engine wherein the number of revolutions can be set to ten stages [1] through [10], for example. When the accelerator dial 36 is set to [1], the number of revolutions is set to 850 rpm, when the acceleration dial 36 is set to [5], the number of revolutions is set to 1,450 rpm, and when the acceleration dial 36 is set to [10], the number of engine revolutions are set to 2,200 rpm.

Figure 4:
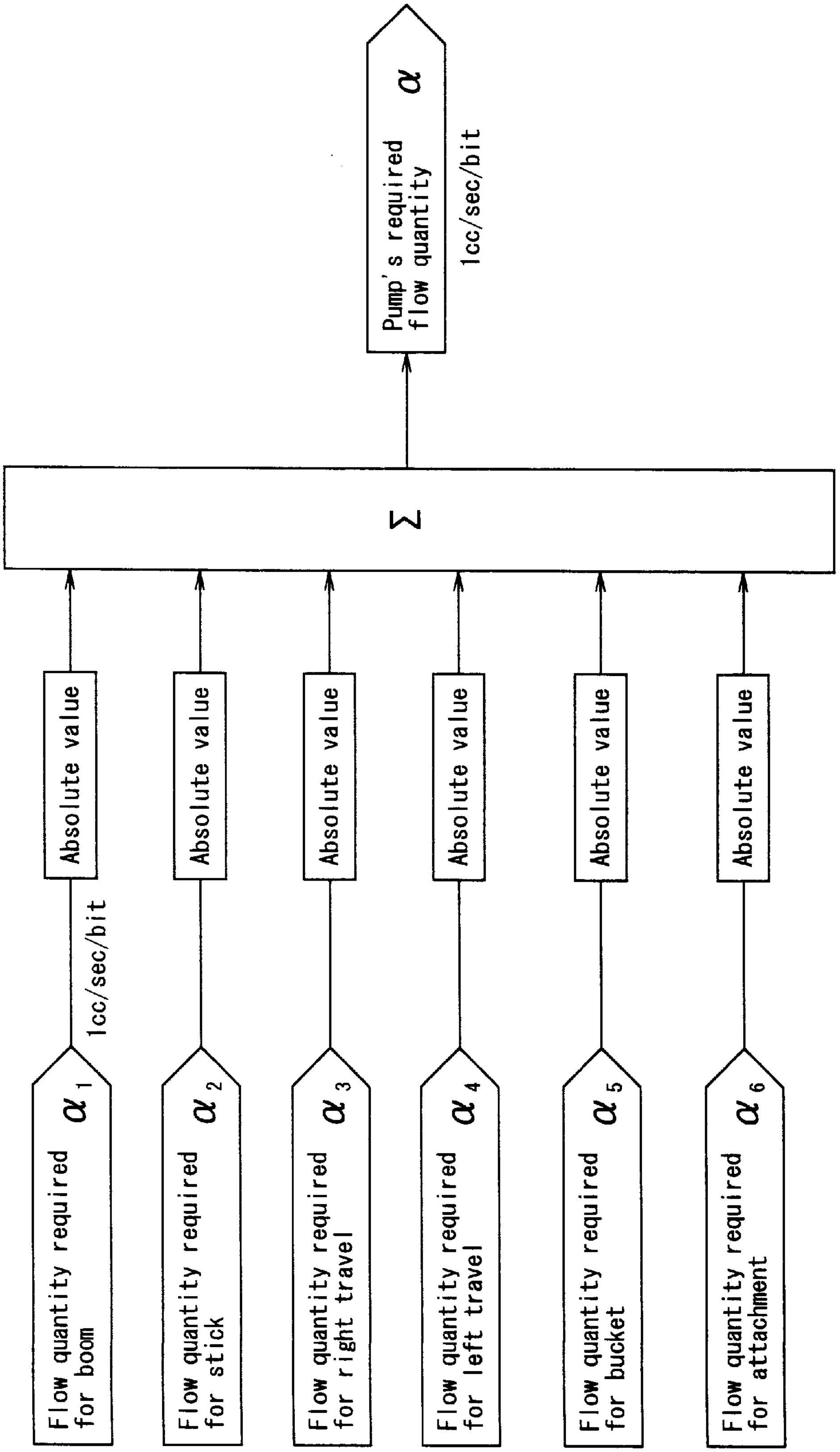
FIG. 4 is a control block diagram showing a calculation procedure of the flow quantity requested with respect to the pump.

Next, in FIG. 4, a description is given of a controlling procedure for the above-mentioned control unit 26. First, an operation speed requested to respective hydraulic actuators 8 through 13 corresponding thereto is calculated on the basis of the operation quantity of an operating tool, which is inputted from the above operation quantity detecting means 29 through 34. The required flow $\alpha_1$ through $\alpha_6$ necessary to obtain the corresponding operation speed is then obtained. Next, the total sum of the absolute values of the required flow $\alpha_1$ through $\alpha_6$ of the respective hydraulic actuators 8 through 13 is calculated with the total sum used as a pump required flow $\alpha$.

Figure 5:
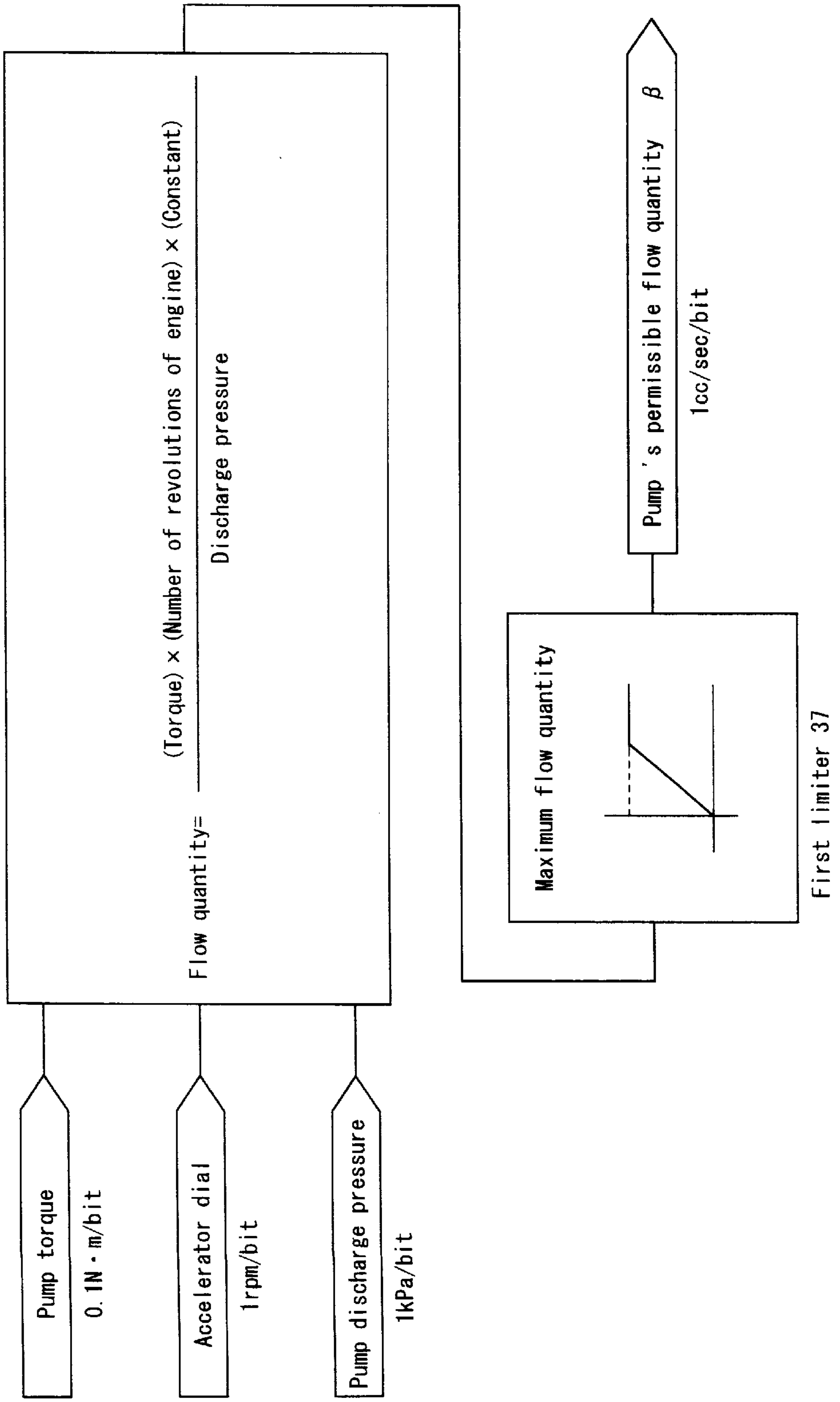
FIG. 5 is a control block diagram showing a calculation of the permissible flow quantity of the pump.

On the other hand, by using the maximum torque, which the hydraulic pump P can output at the current time, the discharge pressure of the hydraulic pump P detected by the above-mentioned pressure sensor 35 and the number of revolutions established by the accelerator dial 36 can be used to calculate the permissible flow $\beta$ (the maximum flow quantity which the hydraulic pump P can output) of the hydraulic pump P. In this case, as shown in the flow quantity flow expression of FIG. 5, as the discharge pressure of the hydraulic pump P is decreased, the pump flow quantity is accordingly increased. However, the first limiter 37 is provided such that when the discharge pressure became extraordinarily low, the permissible flow $\beta$ of the pump does not become greater than the maximum flow that the hydraulic pump P can output.

Figure 6:
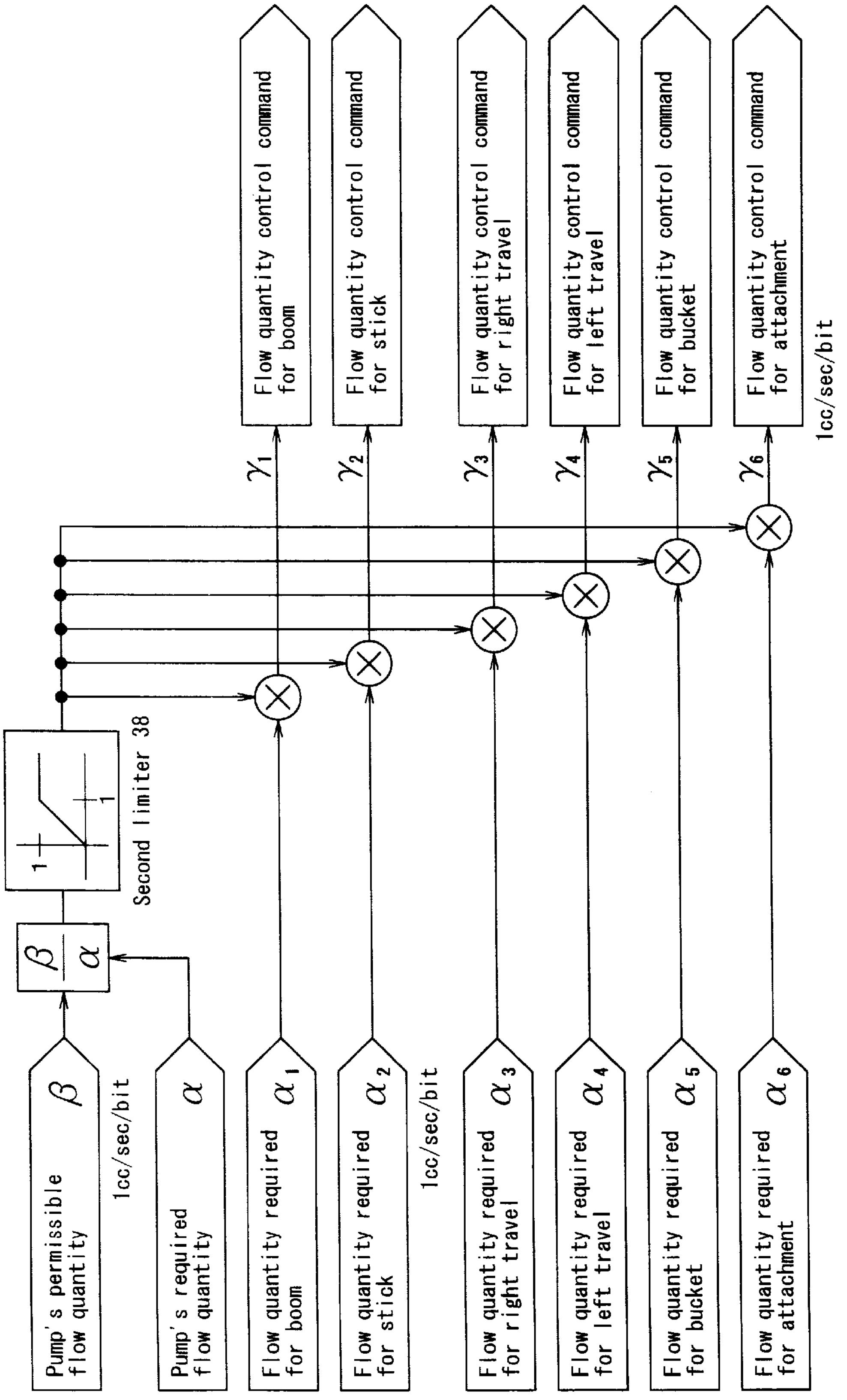
FIG. 6 is a control block diagram showing a calculation procedure for a shared flow quantity.

Next, in FIG. 6, a ratio ($\beta/\alpha$) of the permissible flow, with the required capacity $\alpha$ of the above-mentioned pump is obtained. The ratio is multiplied by the required quantities flows $\alpha_1$ through $\alpha_6$ of the respective hydraulic actuators 8 through 13 in order to obtain the shared flow quantities $\gamma_1$ through $\gamma_6$ ($\gamma_1$ through $\gamma_6$=$\alpha_1$ through $\alpha_6 \times \beta/\alpha$) which is shared to the respective hydraulic actuators 8 through 13. In this case, where the permissible flows $\beta$ of the pump is greater than the required flow $\alpha$, the above-mentioned ratio ($\beta/\alpha$) becomes greater than 1, a problem occurs in that the flows $\gamma_1$ through $\gamma_6$ of the respective hydraulic actuators 8 through 13 become greater than the required flows $\alpha_1$ through $\alpha_6$. In order to prevent this problem, where the above-mentioned ratio ($\beta/\alpha$) is greater than 1 (that is, $\{(\beta/\alpha)=1\}$, the second limiter 38 is provided to limit the ratio to 1, whereby the required flows $\alpha_1$ through $\alpha_6$ of the respective hydraulic actuators 8 through 13 are set so as to become the shared flows $\gamma_1$ through $\gamma_6$ where the permissible flow $\beta$ of the pump is greater than the required flow $\alpha$ of the pump.

The control unit 26 then outputs control commands to the electromagnetic proportional pressure valves 20A through 25A, and 20B through 25B in order to control the degree of openness of the control valves 14 through 19 so that the flow of pressurized oil supplied to the respective hydraulic actuators 8 through 13 become the above-mentioned shared flows $\gamma_1$ through $\gamma_6$. Thereby, the degree of openness of the control valves 14 through 19 corresponds to the shared flows $\gamma_1$ through $\gamma_6$ in which the output flow of the hydraulic pump P is shared to the respective hydraulic actuators 8 through 13, and the corresponding shared flows $\gamma_1$ through $\gamma_6$ are supplied to the respective hydraulic actuators 8 through 13.

In the hydraulic control device thus structured, the operation of the respective hydraulic actuators 8 through 13 is carried out by the feeding of pressurized oil from the hydraulic pump P on the basis of the operation of an operating tool. In this case, the degree of openness of the control valves 14 through 19 which control the feeding of pressurized oil for the hydraulic actuators 8 through 13 is controlled so that the quantity of oil flow supplied to the hydraulic actuators 8 through 13 becomes the shared flows $\gamma_1$ through $\gamma_6$ which are obtained by sharing the output flow of the hydraulic pump P corresponding to the quantity of operation of the operating tool.

As a result, when operating a plurality of operating tools where front attachments 4 are operated in an interlocked state, where the total sum of the required flow of the hydraulic actuators 8 through 13, which is requested by the respective operating tools, is greater than the output flow of the hydraulic pump P, the degree of openness of the control valves 14 through 19 will correspond to the flows $\gamma_1$ through $\gamma_6$ which are obtained by sharing the output flow of the hydraulic pump P on the basis of the quantity of operation of the respective operating tools, wherein because the corresponding shared flows $\gamma_1$ through $\gamma_6$ are supplied to the respective hydraulic actuators 8 through 13, the output flow of the hydraulic pump P can be adequately shared to the respective hydraulic actuators 8 through 13. Furthermore, in this case, as the degree of openness of the control valves 14 through 19 corresponds to the shared flows $\gamma_1$ through $\gamma_6$, the degree of openness of the control valves 14 through 19 cannot become greater than the feeding flow as in the prior arts. Therefore, the front attachments 4 can be smoothly actuated where of the operation efficiency is improved.

What is claimed is:

1. A hydraulic control device for a work machine having operating tools, comprising:

a plurality of hydraulic actuators;

a hydraulic pump for feeding pressurized oil to the plurality of hydraulic actuators;

a plurality of control valves for controlling feeding of pressurized oil to the plurality of hydraulic actuators;

a valve operating means for operating respective control valves;

an operation status detecting means for detecting the operation status of the operating tools corresponding to respective hydraulic actuators; and a control unit which inputs signals coming from the operation status detecting means and outputs control commands to the valve operating means corresponding thereto on the basis of the corresponding input signals;

the control unit calculating the flow for sharing an output flow of the hydraulic pump to the plurality of hydraulic actuators on the basis of input signals from the operation status detecting means and outputting control commands to the valve operating means in order to feed shared flows to the plurality of hydraulic actuators.

2. The hydraulic controlling device for a work machine having operating tools as set forth in claim 1, wherein the output flow of the hydraulic pump is calculated based on a maximum torque, number of engine revolutions, and discharge pressure of the hydraulic pump.

3. The hydraulic controlling device for a work machine having operating tools as set forth in claim 2, wherein when the sum of a required flow of the respective hydraulic actuators obtained based on the operating status of an operating tool is smaller than the output flow of the hydraulic pump, the required flow to the respective hydraulic actuators are set so that the required flow becomes the shared flow.

4. The hydraulic controlling device for a work machine having operating tools as set forth in claim 2, wherein when the output flow of the hydraulic pump is calculated based on the maximum torque, number of engine revolutions, and discharge pressure of the hydraulic pump at the moment, the output flow is limited to a maximum flow of the hydraulic pump.

5. The hydraulic controlling device for a work machine having operating tools as set forth in claim 2, further comprising an accelerator dial for setting the number of engine revolutions.

6. The hydraulic controlling device for a work machine having operating tools as set forth in claim 1, wherein when a sum of a required flow of the respective hydraulic actuators obtained based on the operating status of an operating tool is smaller than the output flow of the hydraulic pump, the required flow to the respective hydraulic actuators is set so that the required flow becomes the shared flow.

7. A method of determining an amount of hydraulic flow for operating tools for a hydraulic control device, comprising the steps of:

determining a required flow from input signals coming from an operation status detecting means for detecting an operation status of the operating tools;

determining an output flow of a hydraulic pump for feeding flow to the operating tools; and determining a shared flow for each operating tool of the operating tools based on the required flow and the output flow.

8. The method of determining an amount of hydraulic flow for operating tools for a hydraulic control device as set forth in claim 7, wherein the output flow of a hydraulic pump is calculated based on a maximum torque, number of engine revolutions, and discharge pressure of the hydraulic pump.

9. The method of determining an amount of hydraulic flow for operating tools for a hydraulic control device as set forth in claim 8, further comprising setting the required flow as to become the shared flow when a sum of the required flow is smaller than the output flow.

10. The method of determining an amount of hydraulic flow for operating tools for a hydraulic control device as set forth in claim 8, wherein when the output flow of a hydraulic pump is calculated based on the maximum torque, number of engine revolutions, and discharge pressure of the hydraulic pump at the moment, the output flow is limited to a maximum flow of the hydraulic pump.

11. The method of determining an amount of hydraulic flow for operating tools for a hydraulic control device as set forth in claim 8, further comprising setting the number of engine revolutions with an accelerator dial.

12. The method of determining an amount of hydraulic flow for operating tools for a hydraulic control device as set forth in claim 7, further comprising setting the required flow as to become the shared flow when a sum of the required flow is smaller than the output flow.

13. A hydraulic control device for a work machine having operating tools, comprising:

a plurality of hydraulic actuators;

a hydraulic pump for feeding pressurized fluid to the plurality of hydraulic actuators; and a control unit for determining a required flow for each of the plurality of hydraulic actuators, for determining a permissible flow for the hydraulic pump, and thereafter individually determining a flow to be shared by each of the plurality of hydraulic actuators based on the required flow and the permissible flow.

14. The hydraulic control device for a work machine having operating tools as set forth in claim 13, wherein the permissible flow is calculated based on a maximum torque, number of engine resolutions and discharge pressure of the hydraulic pump.

15. The hydraulic control device for a work machine having operating tools as set forth in claim 14, wherein when the sum of the required flow is less than the permissible flow, the required flow to the respective hydraulic actuators are set so that they become the flow to be shared by each of the plurality of the hydraulic actuators.

16. The hydraulic controlling device for a work machine having operating tools as set forth in claim 14, wherein when the permissible flow of the hydraulic pump is calculated based on the maximum torque, number of engine revolutions, and discharge pressure of the hydraulic pump at the moment, the permissible flow is limited to a maximum flow of the hydraulic pump.

17. The hydraulic controlling device for a work machine having operating tools as set forth in claim 14, further comprising an accelerator dial for setting the number of engine revolutions.

18. The hydraulic controlling device for a work machine having operating tools as set forth in claim 13, wherein when a sum of a required flow of the respective hydraulic actuators obtained based on of the operating status of an operating tool is smaller than the permissible flow of the hydraulic pump, the required flow to the respective hydraulic actuators is set so that the required flow becomes the shared flow.

* * * * *